United States Patent Office 3,251,887
Patented May 17, 1966

3,251,887
CHLORINATION PROCESS
Earl S. Huyser, Lawrence, Kans., assignor to The Dow Chemical Company, Midland, Mich., a corporation of Delaware
No Drawing. Filed July 19, 1961, Ser. No. 125,086
6 Claims. (Cl. 260—612)

This invention relates to a process for chlorinating alkylated aromatic compounds.

More particularly, this invention relates to a process for selectively chlorinating benzylic carbon atoms present in these compounds to obtain chlorinated derivatives free of unwanted isomers and in better yields than is possible by conventional methods.

This application is a continuation-in-part of application Serial No. 33,377, filed June 2, 1960, now abandoned.

Chlorination is ordinarily accomplished by the use of chlorine gas under such conditions as are suitable for the particular compound and for the chlorinated product sought. In many cases, chlorination by chlorine gas is nonselective and mixtures of products are obtained. Consequently, yields of desired products are lowered and difficulties in separation and purification often arise. Chlorine has the further disadvantage of being a gas with attendant complications in handling.

Other chlorinating agents have been used, usually in rather limited applications. For example, N-chloro-succinimide has been used in the same manner as the more common N-bromosuccinimide for halogenation of certain olefins in which only allylic halogenation occurs. Recently tert-butyl hypochlorite has been studied as a chlorinating agent. It has the disadvantage of relative unstability and it has no advantage over chlorine as far as selectivity in the site of chlorination is concerned.

I have found that trichloromethanesulfonyl chloride in the presence of a free radical initiating catalyst will chlorinate selectively a benzylic carbon atom in a compound having the structure.

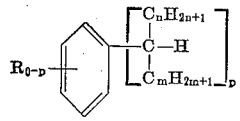

wherein $p$ is an integer from 1 to 3, $m$ and $n$ are integers from zero to 8, and each R is individually selected from the group consisting of hydrogen, haloalkyl radicals of 1–4 carbon atoms wherein halogen is fluorine, chlorine, or bromine, alkoxy radicals of 1–4 carbon atoms, cyano radicals, carbalkoxy radicals containing 2–4 carbon atoms, nitro groups, chlorine, bromine and fluorine. Compounds represented by this general formula include toluene, xylene, mesitylene, ethylbenzene, diethylbenzene, butyltoluene, sec-butylbenzene, dibutylbenzene, octyltoluene, (2-ethylhexyl)benzene, ar-bromotoluene, α-chloroxylene, butylfluorobenzene, 2-bromo-4-(1-chloroethyl)toluene, diethylnitrobenzene, 2-chloro-4-nitrotoluene, ethylanisole, methyl toluate, tolunitrile, ar-chlorotolunitrile, diethylbromobenzonitrile, butyldichlorobenzene, methyl butyl nitrobenzoate, and similar compounds.

For example, ethylbenzene is chlorinated by trichloromethanesulfonyl chloride under free radical initiating conditions to give only (1-chloroethyl)benzene whereas ethylbenzene is chlorinated by chlorine gas under the same conditions to a mixture of (1-chloroethyl)benzene and (2-chloroethyl)benzene.

Compounds such as the methylanisoles can be chlorinated by this new method to yield only the methoxybenzyl chlorides without any ring chlorination such as that encountered when chlorine is used.

The xylenes can be dichlorinated by trichloromethanesulfonyl chloride to give higher yields of the α,α'-dichloroxylenes than can be obtained by the use of chlorine.

Another advantage of trichloromethanesulfonyl chloride as a chlorinating agent is the fact that ring-substituted bromine is not displaced as it frequently is when chlorine is used. Thus, ar-bromotoluenes can be chlorinated by this new process to give the corresponding bromobenzyl chlorides with no replacement of bromine by chlorine.

Trichloromethanesulfonyl chloride has the further advantage of being a stable, relatively high-melting solid and so it is easily handled in simplified apparatus.

The chlorination reaction using trichloromethanesulfonyl chloride proceeds smoothly with the formation of two by-products, sulfur dioxide and chloroform. Either of these may be used conveniently as a means of measuring the extent of reaction. Sulfur dioxide, a gas, is given off during the reaction, and its evolution is useful, not only as evidence of reaction occurring, but also as a convenient measure of the progress of the chlorination. The other by-product, chloroform, is a low boiling liquid which is easily separated by distillation from the reaction mixture. It offers another measure of the extent of reaction.

The chlorination is usually run at a moderate temperature, a suitable range being about 65–150° C. For example, the chlorination of toluene may be run conveniently at a temperature in the range 80–115° C. Very little reaction with toluene has been found to occur at 50° C.

Free radical initiating catalysts which are effective in the process include azo catalysts, such as azobisisobutyronitrile, acyl peroxides such as acetyl peroxide and benzoyl peroxide, alkyl peroxides such as di-tert-butyl peroxide, and irradiation under the influence of high energy fields which may include various actinic radiations such as ultra-violet light and X-rays, or high energy radiations such as accelerated electrons and gamma radiation as well as radiation from radioactive materials.

The presence of an effective amount of one of these catalysts is essential to practical operation of the process. For example, when a solution of trichloromethanesulfonyl chloride in toluene containing one mole of trichloromethanesulfonyl chloride to five moles of toluene was heated at 115–117° C. For six hours in the absence of light, only traces of the reaction products, sulfur dioxide and chloroform, were detected in the reaction mixture. When the same reaction mixture was illuminated by a 275 watt sunlamp for six hours at the same temperature, fifty percent of the trichloromethanesulfonyl chloride was converted into reaction products and an equivalent amount of benzyl chloride was formed.

A preferred catalyst is actinic light supplied by strong sunlight or a source such as a sunlamp. Other catalysts which are also convenient to use and which may be preferred in some cases are azo catalysts and peroxide catalysts such as azobisisobutyronitrile and benzoyl peroxide or di-tert-butyl peroxide. These are effective in initiating the chlorination reaction and they need be used only in small amounts, proportions of about 0.001–0.1 mole per mole of trichloromethylanesulfonyl chloride being satisfactory.

For convenience in running the reaction, the compound being chlorinated is ordinarily present in a molar ratio of about five or ten to one of the trichloromethanesulfonyl chloride, the excess thereby serving as a solvent medium for the reaction. As far as is known, this ratio is not critical.

My preferred method of operation is to heat a solution of one mole of trichloromethanesulfonyl chloride in from five to ten moles of the compound being chlorinated at a temperature of about 90–120° C. and in the presence of an effective amount of a free radical initiating catalyst, and to allow the process to continue until the volume of sulfur dioxide evolved indicates that the reaction is substantially completed. The reaction mixture may then be distilled in the usual way to separate the components.

The following examples illustrate some ways in which my invention has been used:

Example 1

A solution of 0.18 g. mole of trichloromethanesulfonyl chloride in 1.0 g. mole of ethylbenzene was put in a 250 cc. round bottomed Pyrex flask and stirred 6 hrs. at 110°–115° C. under illumination by a 275 watt G.E. sunlamp. During the course of the illumination, sulfur dioxide was evolved from the reaction mixture. The reaction mixture was then distilled, yielding 0.13 g. mole of chloroform, unreacted ethylbenzene, and 0.13 g. mole of (1-chloroethyl)benzene (B.P. 84° C./20 mm.). No detectable amount of (2-chloroethyl)benzene was found in the reaction mixture by infrared spectroscopic analysis.

Example 2

A reaction mixture consisting of 1.0 g. mole of ethylbenzene, 0.2 g. mole of trichloromethanesulfonyl chloride and 0.012 g. mole of benzoyl peroxide was stirred and heated at 78–80° C. for 72 hours, sulfur dioxide being evolved from the reaction mixture during this time. The reaction mixture was then distilled and 0.11 g. mole of chloroform and 0.10 g. mole of (1-chloroethyl)benzene were obtained as products, no (2-chloroethyl)benzene being found by infrared examination of the latter product.

In contrast to Examples 1 and 2, photochloroination of ethylbenzene with chlorine at 78–80° C. yielded a (1-chloroethyl)benzene fraction containing about 10 percent of (2-chloroethyl)-benzene and a benzoyl peroxide initiated chlorination of ethylbenzene with sulfuryl chloride at 80° C. gave a product which contained about 7 percent of (2-chloroethyl)benzene.

Example 3

A solution of 0.115 g. mole of trichloromethanesulfonyl chloride in 0.5 g. mole of p-bromotoluene was stirred 10 hrs. at 110–115° C. under sunlamp illumination as in Example 1. The reaction mixture was distilled and 0.10 g. mole of chloroform, unreacted p-bromotoluene, and 0.11 g. mole of p-bromobenzyl chloride were obtained.

Example 4

A solution of 0.18 g. mole of trichloromethanesulfonyl chloride in 1 g. mole of α-chloro-p-xylene was stirred 6 hrs. at 110–115° C. under sunlamp illumination as in Example 1. On distillation of the reaction mixture, 0.10 g. mole of chloroform, unreacted α-chloro-p-xylene, and 0.05 g. mole of α,α'-dichloro-p-xylene, M.P. 98–99° C., were obtained.

Example 5

Under conditions similar to those described in Example 2, toluene was reacted with trichloromethanesulfonyl chloride, using azobisisobutyronitrile as the initiating catalyst. A nearly quantitative yield of benzyl chloride was produced.

Similarly, when a solution of trichloromethanesulfonyl chloride in toluene is exposed for 5 hours to a total dose of 0.5 megarad of radiation from a cobalt 60 source at about 110° C., comparable results are obtained.

Other compounds representative of those which can be chlorinated in like manner by trichloromethanesulfonyl chloride include xylene, methylanisole, methyl toluate, tolunitrile, propylbenzene, isopropylbenzene, sec-butylbenzene, amylbenzene, (1-ethylpropyl)benzene, mesitylene, diethylbenzene, butyltoluene, dibutylbenzene, butylfluorobenzene, 2-bromo-4-(1-chloroethyl)toluene, diethylnitrobenzene, 2-chloro-4-nitrotoluene, ethylanisole, ar-chlorotolunitrile, diethylbromobenzonitrile, butyldichlorobenzene, and methyl butylnitrobenzoate, each of which yields the corresponding compound monochlorinated on the alpha carbon atom of the alkyl substituent.

I claim:

1. A process for chlorinating a compound having the structure

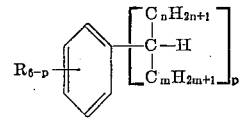

wherein $p$ is an integer from 1 to 3, $m$ and $n$ are integers from zero to 8, and each R is individually selected from the group consisting of hydrogen, haloalkyl radicals of 1–4 carbon atoms wherein the halogen has an atomic number less than 36, alkoxy radicals of 1–4 carbon atoms, cyano radicals, carbalkoxy radicals containing 2–4 carbon atoms, nitro groups, fluorine, chlorine, and bromine, which process comprises reacting by contacting said compound with trichloromethanesulfonyl chloride in the liquid phase at about 65–150° C. in the presence of an effective amount of a free radical initiating catalyst thereby producing a benzyl chloride of the formula

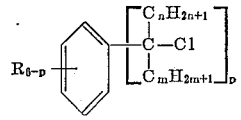

wherein R, $p$, $m$, and $n$ are as defined above.

2. The process of claim 1 wherein the compound is ar-monobromotoluene.

3. The process of claim 1 wherein the compound is xylene.

4. The process of claim 1 wherein the compound is α-chloroxylene.

5. The process of claim 1 wherein the compound is ethylbenzene.

6. The process of claim 1 wherein the compound is methylanisole.

References Cited by the Examiner

FOREIGN PATENTS 650,204  2/1951  Great Britain.

OTHER REFERENCES

Goerner et al.: Jour. Amer. Chem. Soc., volume 73 (1951), pages 2940–2941.

Huntress: "Organic Chlorine Compounds," pp. 1161 and 1194 (1948).

LEON ZITVER, *Primary Examiner.*